(12) United States Patent
Varekamp et al.

(10) Patent No.: US 10,212,407 B2
(45) Date of Patent: Feb. 19, 2019

(54) PROCESSING A DISPARITY OF A THREE DIMENSIONAL IMAGE

(71) Applicant: KONINKLIJKE PHILIPS N.V., Eindhoven (NL)

(72) Inventors: Christiaan Varekamp, Eindhoven (NL); Patrick Luc Els Vandewalle, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/515,160

(22) PCT Filed: Sep. 24, 2015

(86) PCT No.: PCT/EP2015/071929
§ 371 (c)(1),
(2) Date: Mar. 29, 2017

(87) PCT Pub. No.: WO2016/058801
PCT Pub. Date: Apr. 21, 2016

(65) Prior Publication Data
US 2017/0223331 A1 Aug. 3, 2017

(30) Foreign Application Priority Data
Oct. 14, 2014 (EP) .................................. 14188756

(51) Int. Cl.
*H04N 13/122* (2018.01)
*H04N 13/128* (2018.01)
*H04N 13/00* (2018.01)

(52) U.S. Cl.
CPC ......... *H04N 13/122* (2018.05); *H04N 13/128* (2018.05); *H04N 2013/0081* (2013.01);
(Continued)

(58) Field of Classification Search
None
See application file for complete search history.

(56) References Cited

U.S. PATENT DOCUMENTS 5,719,954 A   2/1998  Onda
5,923,780 A * 7/1999  Morfill .................... G01D 1/14
                                                      382/170
(Continued)

OTHER PUBLICATIONS

Scharstein et al "A Taxonomy and Evaluation of Dense Two-Frame Stereo Correspondence Algorithms" International Journal of Computer Vision 47 Apr. 2002 p. 7-42.
(Continued)

*Primary Examiner* — Said Broome

(57) ABSTRACT

An apparatus for reducing the visibility of disparity estimation errors at edges, and in particular at overlays. The apparatus comprises a receiver (401) for receiving a three dimensional image represented by at least image values (brightness/contrast values) and a disparity value. A subset selector (403) evaluates an image property criterion for the image value for a group of pixels and determines a subset of pixels of the group of pixels for which the image property criterion is met. The criterion may for example reflect whether the pixel belongs to an image object edge. A distribution evaluator (405) generates a frequency distribution for disparity values of the subset of pixels and an analyzer (407) determines a shape property for the frequency distribution (the presence of a peak). An adaptor (409) determining a disparity remapping in response to the shape property and a remapper (411) modifies disparity values of the three dimensional image by applying the disparity remapping. The approach may e.g. reduce image depth when overlay graphics is likely to be present.

21 Claims, 5 Drawing Sheets

(52) U.S. Cl.
CPC ............... *H04N 2013/0092* (2013.01); *H04N 2213/003* (2013.01)

(56) References Cited

U.S. PATENT DOCUMENTS

| | | | |
|---|---|---|---|
| 6,468,218 B1 * | 10/2002 | Chen | A61B 6/469 128/916 |
| 2009/0022396 A1 * | 1/2009 | Watanabe | G06K 9/4633 382/167 |
| 2011/0234765 A1 | 9/2011 | Tanaka | |
| 2012/0314933 A1 | 12/2012 | Morifuji | |
| 2013/0308826 A1 | 11/2013 | Asano | |
| 2014/0055450 A1 | 2/2014 | Limonov et al. | |

OTHER PUBLICATIONS

Lang, M., Hornung, A., Wang, O., Poulakos, S., Smolic, A. & Gross, M., Nonlinear Disparity Mapping for Stereoscopic 3D. ACM Transactions on Graphics (Proc. SIGGRAPH). 2010.

H. Hirschmüller and D. Scharstein. Evaluation of cost functions for stereo matching. In IEEE Computer Society Conference on Computer Vision and Pattern Recognition (CVPR 2007), Minneapolis, MN, Jun. 2007.

\* cited by examiner

PROCESSING A DISPARITY OF A THREE DIMENSIONAL IMAGE

CROSS-REFERENCE TO PRIOR APPLICATIONS

This application is the U.S. National Phase application under 35 U.S.C. § 371 of International Application No. PCT/EP2015/071929, filed on Sep. 24, 2015, which claims the benefit of EP Patent Application No. EP 14188756.2, filed on Oct. 14, 2014. These applications are hereby incorporated by reference herein.

FIELD OF THE INVENTION

The invention relates to processing of a three dimensional image, and specifically, but not exclusively, to disparity processing for three dimensional images comprising graphic overlays.

BACKGROUND OF THE INVENTION

Three dimensional (3D) displays add a third dimension to the viewing experience by providing a viewer's two eyes with different views of the scene being watched. This can be achieved by having the user wear glasses to separate two views that are displayed. However, as this may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

In order to fulfill the desire for 3D image effects, content is created to include data that describes 3D aspects of the captured scene. For example, for computer generated graphics, a three dimensional model can be developed and used to calculate the image from a given viewing position. Such an approach is for example frequently used for computer games which provide a three dimensional effect.

As another example, video content, such as films or television programs, are increasingly generated to include some 3D information. Such information can be captured using dedicated 3D cameras that capture two simultaneous images from slightly offset camera positions. In some cases, more simultaneous images may be captured from further offset positions. For example, nine cameras offset relative to each other could be used to generate images corresponding to the nine viewpoints of a nine view autostereoscopic display.

However, a significant problem is that the additional information results in substantially increased amounts of data, which is impractical for the distribution, communication, processing and storage of the video data. Accordingly, the efficient encoding of 3D information is critical. Therefore, efficient 3D image and video encoding formats have been developed that may reduce the required data rate substantially.

A popular approach for representing three dimensional images is to use one or more layered two dimensional images with associated depth data. For example, a foreground and background image with associated depth information may be used to represent a three dimensional scene, or a single image and associated depth map can be used.

The encoding formats allow a high quality rendering of the directly encoded images, i.e. they allow high quality rendering of images corresponding to the viewpoint for which the image data is encoded. The encoding format furthermore allows an image processing unit to generate images for viewpoints that are displaced relative to the viewpoint of the captured images. Similarly, image objects may be shifted in the image (or images) based on depth information provided with the image data. Further, areas not represented by the image may be filled in using occlusion information if such information is available.

However, whereas an encoding of 3D scenes using one or more images with associated depth maps providing depth information allows for a very efficient representation, the resulting three dimensional experience is highly dependent on sufficiently accurate depth information being provided by the depth map(s).

Furthermore, much content is generated or provided as stereo images without associated depth information. For many operations, it is accordingly desirable to determine depth information for the scene and image objects based on depth estimation. In practice, the disparity between images directly reflect the depth of an object, and the terms depth and disparity are often used interchangeably. Specifically, a disparity value is also a depth value, and a depth value is also a disparity value.

Many different techniques are known for depth/disparity information. Disparity estimation may be used for various 3D-related applications including for example multi-view rendering from stereo, disparity adjustment for stereo viewing, machine vision for robot navigation, etc.

In disparity estimation, a distance between corresponding points in two or more image is estimated, usually with the intention to infer depth via triangulation using known camera parameters. For example, if two images corresponding to different viewing angles are provided, matching image regions may be identified in the two images and the depth/disparity may be estimated by the relative offset between the positions of the regions. Thus, algorithms may be applied to estimate disparities between two images with the disparities directly indicating a depth of the corresponding objects. The detection of matching regions may for example be based on a cross-correlation of image regions across the two images. An example of disparity estimation may be found in D. Scharstein and R. Szeliski."A taxonomy and evaluation of dense two-frame stereo correspondence algorithms", International Journal of Computer Vision, 47(1/2/3):7-42, April-June 2002.

However, although disparity estimation may be useful for determining depth information in many situations, it tends to not provide ideal performance and the generated depth information may be quite noisy and comprise inaccuracies.

US2011/234765 discloses an apparatus capable of suppressing erroneous correction which easily occurs in the vicinity of the boundary between the foreground and the background and generating a parallax map with high accuracy.

US2013/308826 discloses that when a peak of the frequency distribution appears discretely on the histogram where the parallax (distance information) is a variable, and the distribution width of the distance information is wide, a target region expressed as a histogram is normally a region where a closer object and a farther object whose distances from the stereo camera are discrete coexist and is called "perspective conflict region".

In many cases, a color-adaptive (bi-lateral) filter with a large filter kernel is applied to either up-scale a low-resolution disparity estimate or more often to reduce errors/noise in the disparity estimates. When applied to image based rendering of 3D video, this filter ensures stable and often smooth disparity maps. However, it also results in new artifacts caused by the filtering operation. If an object, and in particular its edge, has a varying color profile, the disparity values will also tend to (incorrectly) vary over the edge. Such a varying color profile can be caused for example by lighting changes or shadows. This causes disparity variations over the object, and results in distorted edges in synthesized views. These distortions are disturbing for a human observer, as our human visual system is particularly sensitive to (distortions in) straight edges.

Such distortions may cause a significant perceived quality reduction by a human observer, such as e.g. when graphics overlays are present.

To illustrate this, the stereo images of FIG. 1 may be considered. In the example, a textured image is overlaid by a graphics overlay. FIG. 2 illustrates the left image and an estimated block-based disparity. Errors are clearly visible in the disparity map. FIG. 3 illustrates the left image and estimated disparity after color adaptive filtering has been applied to the disparity map of FIG. 2. Although the disparity map is less blocky and appears smoother, there are still substantial disparity errors in the area around the text.

Similar depth and disparity artefacts may arise for other approaches of generating depth information for three dimensional images, and may degrade perceived quality of the resulting three dimensional images that are presented to a user.

Hence, generation of improved disparity data would be advantageous and in particular generation or determination of disparity values allowing increased flexibility, reduced complexity, facilitated implementation, improved perceived depth, improved performance, reduced perceived depth artifacts, and/or an improved three dimensional image would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for processing a three dimensional image, the apparatus comprising: a receiver circuit arranged to receive a three dimensional image, wherein each pixel of at least a group of pixels of the three dimensional image has an associated image value and an associated disparity value; a subset selector circuit arranged to evaluate an image property criterion for the associated image value of each pixel of the group of pixels and determining a subset of pixels of the group of pixels for which the image property criterion is met; a distribution evaluator circuit for generating a frequency distribution of the associated disparity values of the subset of pixels; an analyzer arranged to determine a shape property for the frequency distribution, wherein the shape property is indicative of a property of at least one peak of the frequency distribution; an adaptor circuit for determining a disparity remapping in response to the shape property, wherein the adaptor is arranged to increase a disparity compression provided by the disparity remapping in response to an increasing peakedness of the frequency distribution; and a remapper circuit arranged to modify the associated disparity values of at least a portion of the pixels of the three dimensional image by applying the disparity remapping to the associated disparity values the portion of the pixels.

The invention may provide an improved three dimensional image for many applications and in many scenarios, and may in many embodiments provide an improved three dimensional image where disparity errors, inaccuracies or artefacts may be mitigated or reduced. The invention may in particular, in many embodiments, be suitable for mitigating disparity artefacts, errors and inaccuracies for three dimensional images wherein the disparity data has been generated by disparity estimation based on e.g. stereo images. Improvements can in particular be generated for images that may potentially include overlay graphics, such as subtitles, text, titles etc.

The approach may in many embodiments be arranged to automatically adapt the effect of the processing to reflect the likelihood of the image comprising overlay graphics.

In particular, the Inventors have realized not only that disparity errors and noise may be more prevalent around graphic overlays (e.g. when disparity is generated by disparity estimation) but also that the likelihood of an image comprising graphic overlays may be estimated by considering particular characteristics and how these are distributed in the depth dimension. The Inventors have further realized that the adverse effect of disparity degradation on rendering from image plus depth can be mitigated by (often positionally non-specific) disparity remapping controlled by such characteristics of such a depth/disparity distribution.

A disparity value may be any value that is indicative of a disparity or depth for a pixel. A disparity value may specifically indicate a horizontal distance between corresponding pixels in two images of a scene where the two images correspond to different viewing directions. A disparity value is indicative of a depth of the corresponding pixel, and equivalently a depth value is indicative of a disparity. Thus, a depth value is also a disparity value, and a disparity value is a depth value. It will be appreciated that the term depth and disparity may as appropriate be considered equivalent terms. Thus, references to disparity may as appropriate be replaced by references to depth, and references to depth may as appropriate be replaced by references to disparity.

The disparity values may have a different resolution than the image values, and specifically the disparity values may be provided at a lower resolution than the image values. Thus, in some embodiments, two or more pixels may share the same disparity value, i.e. a disparity value may be common or shared for a plurality of pixels.

An image value of the pixel may be any value that is indicative of any of a chrominance, chroma, luminance, luma, intensity, brightness, or color property of the pixel. An image value may be a composite image value comprising a plurality of components or values. Specifically, an image value may be a set of values for different color channels, such as e.g. RGB values.

The disparity remapping may be a function or mapping which generates an output disparity value from an input disparity value. The disparity remapping may be represented e.g. by a mathematical equation/function, or e.g. as a look-up table.

In accordance with an optional feature of the invention, the shape property is indicative of a property of at least one peak of the frequency distribution.

This may provide particularly advantageous performance and may in many scenarios provide a particularly good indication of whether the image includes overlay graphic elements or not.

The property of the at least one peak may for example be a magnitude, width or presence probability estimate.

In some embodiments, the shape property may be indicative of a peakedness of the frequency distribution. A peakedness measure may be generated and used as the shape property. The peakedness may include a consideration of a plurality of peaks, and may for example include a consideration of how many peaks are present (in accordance with a suitable peak criterion).

In accordance with an optional feature of the invention, the adaptor is arranged to increase a disparity compression provided by the disparity remapping in response to an increasing peakedness of the frequency distribution.

This may provide improved performance in many embodiments. In particular, the disparity remapping may include a disparity compression for at least one range of disparity levels. The disparity compression may map a disparity range into a smaller disparity range, and thus may reduce the depth variation.

In accordance with an optional feature of the invention, the analyzer is arranged to determine the shape property in response to at least one parameter selected from the group of: a maximum frequency of the frequency distribution; a maximum frequency of the frequency distribution relative to an averaged frequency for the frequency distribution; a width measure for a peak of the frequency distribution; a peak frequency of the frequency distribution relative to frequencies in a disparity level neighborhood of the peak frequency.

This may provide improved performance in many embodiments.

In accordance with an optional feature of the invention, the analyzer is arranged to determine the shape property in response to at least a magnitude of a mode of the frequency distribution.

This may provide improved performance in many embodiments.

In accordance with an optional feature of the invention, the subset selector is arranged to generate an edge detection indication for pixels of the group of pixels, the edge detection indication being indicative of whether the pixel belongs to an image object edge or not; and wherein the image property criterion comprises a requirement for the edge detection indication.

This may provide particularly advantageous performance, and is particularly efficient in detecting overlay graphics and adapting the disparity data to reflect this. The image property criterion may specifically comprise a requirement that the edge detection indication exceeds a threshold (for example that a color channel value differs by more than, say, 25% of the total range between the current pixel and an adjacent pixel).

In accordance with an optional feature of the invention, the subset selector is arranged to generate an image property transition measure for each pixel of the group of pixels, and the image property criterion comprises a requirement for the image property transition measure.

This may provide particularly advantageous performance, and is particularly efficient in detecting overlay graphics and adapting the disparity data to reflect this. The image property criterion may specifically comprise a requirement that the image property transition measure exceeds a threshold (for example that a color channel value differs by more than, say, 25% of the total range between the current pixel and an adjacent pixel). The image property transition measure may specifically be indicative of a (spatial) gradient or degree of change of an image property (e.g. brightness and/or color change) in a neighborhood of the pixel.

In accordance with an optional feature of the invention, the image property criterion comprises a requirement for at least one of a luminance and a chroma for the pixel.

This may in many embodiments provide particularly advantageous performance, and is particularly efficient in detecting overlay graphic and adapting the disparity data to reflect this. The image property criterion may specifically comprise a requirement that the luminance exceeds a value or that the chroma belongs to a given color range.

In some embodiments, the subset selector may be arranged to generate a color saturation measure for each pixel of the group of pixels, and the image property criterion may comprise a requirement for the color saturation measure.

This may in many embodiments provide particularly advantageous performance, and may be particularly efficient in detecting overlay graphic and adapting the disparity data to reflect this. The image property criterion may specifically comprise a requirement that the color saturation measure exceeds a threshold (e.g. that a color space distance measure from the color of the pixel to white exceeds e.g. 50% of the maximum value).

In accordance with an optional feature of the invention, the remapper is arranged to modify disparity values in only a subrange of a disparity range for the disparity values.

This may improve performance and in particular may provide perceived quality improvement in many embodiments. In many embodiments, the subrange may be a subrange in front of the display/screen level, i.e. in front of the image plane corresponding to zero disparity between images.

In accordance with an optional feature of the invention, the analyzer is arranged to determine the shape property in response to only a disparity value subrange of the frequency distribution.

This may improve performance and in particular may provide perceived quality improvement in many embodiments. In many embodiments, the subrange may be a subrange in front of the display/screen level, i.e. in front of the image plane corresponding to zero disparity between images.

In accordance with an optional feature of the invention, the disparity remapping is a linear remapping in at least a disparity level subrange, and the adaptor is arranged to determine a remapping coefficient for the linear remapping in response to the shape property.

This may provide improved performance and/or facilitated implementation in many embodiments.

In accordance with an optional feature of the invention, the distribution evaluator is arranged to weight pixels of the subset of pixels when generating the frequency distribution, the weight for a pixel being dependent on an image position of the pixel.

This may provide improved perceived mitigation of disparity artefacts in many embodiments and scenarios.

In accordance with an optional feature of the invention, the subset selector is arranged to evaluate a second image property criterion for each pixel of the group of pixels and determining a second subset of pixels of the group of pixels for which the second image property criterion is met; and wherein the apparatus is arranged to determine the disparity remapping in response to a frequency distribution for the disparity values for the second subset of pixels.

This may provide improved perceived mitigation of disparity artefacts in many embodiments and scenarios.

In some embodiments, the apparatus may be arranged to determine a second shape property for the second frequency distribution and to determine the disparity remapping in response to both the shape property and the second shape property.

In some embodiments, the apparatus may be arranged to determine the frequency distribution for the disparity values for both the subset of pixels and the second subset of pixels.

According to an aspect of the invention there is provided a method of processing a three dimensional image, the method comprising: receiving a three dimensional image, wherein each pixel of at least a group of pixels of the three dimensional image has an associated an image value and an associated disparity value; evaluating an image property criterion for the associated image value of each pixel of the group of pixels; determining a subset of pixels of the group of pixels for which the image property criterion is met; generating a frequency distribution for associated disparity values of the subset of pixels; determining a shape property for the frequency distribution, wherein the shape property is indicative of a property of at least one peak of the frequency distribution; determining a disparity remapping in response to the shape property, wherein a disparity compression provided by the disparity remapping increases in response to an increasing peakedness of the frequency distribution; and modifying the disparity values for at least a portion of the pixels of the three dimensional image by applying the disparity remapping to the disparity values for the portion of the pixels.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description will focus on embodiments wherein an input three dimensional image is processed based on an estimation of whether the image comprises overlay graphics or not. However, it will be appreciated that the invention is not limited to such an embodiment or application but may be applicable to many different applications and images.

Figure 4:
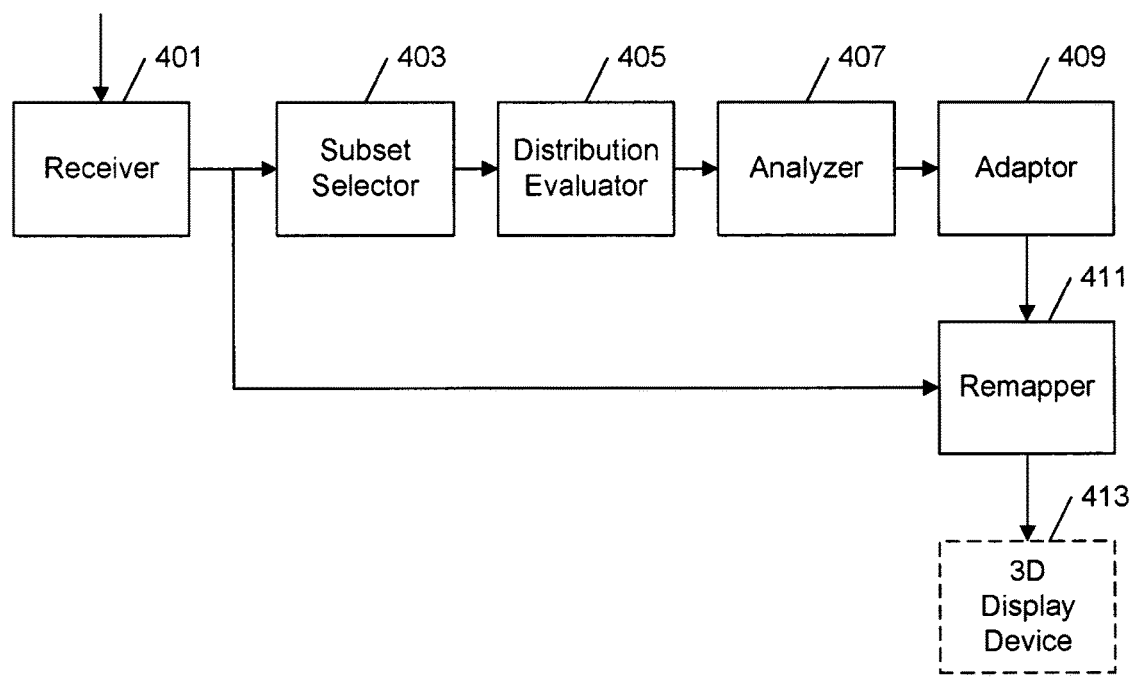
FIG. 4 illustrates an example of an apparatus for processing a 3D image in accordance with some embodiments of the invention.

FIG. 4 illustrates an apparatus for processing a three dimensional (3D) image.

The apparatus comprises a receiver 401 which is arranged to receive a 3D image. The 3D image is made up of pixels and each of these pixels is associated with an image value indicative of the visual light radiating from the object seen at that position and a disparity value indicative of the depth of the object in the scene.

The receiver may for example be a network interface, a media reader, an optical disc reader, a television receiver etc. or indeed may be implemented as any suitable hardware capable of receiving image data from a suitable external or internal source.

Typically, image values are provided for pixels of an image. The image values may be indicative of a visual light radiation characteristics for the spatial position of the pixel, i.e. the image value describes properties of the light radiated from that pixel position for the viewing direction of the image. The image values are typically light intensity (brightness) and/or color related and may specifically be indicative of one or more of luminance, luma, chroma, chrominance, color and brightness.

In many embodiments, the image values may be composite values comprising e.g. a plurality of sub-values corresponding to different components of a color representation, such as e.g. a luminance value and two chroma values of a Yuv representation or the three color channel values of an RGB representation.

Typically, image values are provided at a resolution corresponding to the pixel resolution for the image, or equivalently the pixel resolution may be defined by the image value resolution with one value being provided for each pixel.

In addition to the image values, the 3D image further comprises depth information. In the example, this depth information is provided in the form of disparity values. The disparity values are indicative of a depth of the image object which is seen at corresponding pixel position.

It will be appreciated that disparity values may be any value indicative of a depth of the image object including e.g. a direct disparity indication (e.g. measured in pixels for a given viewing angle difference) or a z-value simply providing a depth indication. It will also be appreciated that disparity values may be signed values, and may often have zero value for zero disparity corresponding to a screen level or display depth, and with the sign of the disparity values changing from behind to in-front of the display level. It will also be appreciated that in the following, references to disparity values may include unsigned values including direct Z-values or absolute disparity indications.

The disparity values for the image are provided as digital values. Thus, the disparity values are provided as quantized values and are thus represented by one of a plurality of possible disparity levels. Thus, the disparity range is divided into a plurality of disparity levels and each disparity value is given as one of these possible disparity levels. Disparity levels accordingly refer to the possible values that the disparity values can take and a disparity value corresponds to the single disparity level for the pixel. A disparity level is thus a possible value of the disparity values.

In many embodiments, the resolution of the image value and the disparity values may be different. Indeed, typically the disparity values are provided in a depth or disparity map which has reduced resolution relative to the image values or pixels. Thus, in some embodiments, one disparity value may be provided for a group of pixels, i.e. each of a group of pixels may be linked to the same disparity value.

The receiver 401 is coupled to a subset selector 403 which is arranged to evaluate an image property criterion for the image value of each pixel of the group of pixels. The subset selector 403 then generates a subset of pixels which includes all the pixels for which the image property criterion is met.

Thus, the subset selector 403 for each pixel considers a criterion relating to the image value, i.e. to a visual component such as a luminance and/or chroma value. Based on this evaluation a subset of pixels is generated and thus specifically the subset of pixels that meet a specific visual criterion is identified.

The subset selector 403 may be implemented in a suitable processing platform or any other suitable hardware. For example, a microprocessor may be arranged to perform the described comparison and select the pixels for the subset. The processor may comprise output interface circuits which can transmit the data for these pixels to external sources.

The subset selector 403 is coupled to a distribution evaluator 405 which generates a frequency distribution for the disparity values for the subset of pixels. The distribution evaluator 405 may for example be implemented as separate hardware such as a microcontroller or microprocessor with interface circuits for receiving data from a microcontroller or microprocessor implementing the subset selector 403.

The frequency distribution may thus reflect the number of occurrences of pixels in the subset for different groups or classes of disparity levels. Each of the classes may be referred to as a bin (corresponding to a histogram representation of the frequency distribution). In many embodiments, the disparity value may have a given (typically relatively low resolution). For example, disparities may be given by 8 bit values allowing 256 different disparity levels. In some embodiments, each class may correspond to a disparity level, i.e. there is one class for each possible disparity value (at least in a given range). In other embodiments, classes may cover a plurality of possible disparity levels, e.g. each class may be given as a disparity level range with each range comprising one or more disparity levels.

In many embodiments, the frequency distribution value for each class is given simply as the sum of the number of pixels in the subset which have a disparity value that falls in the class. Specifically, in embodiments where each class is given as a single disparity level, the distribution evaluator 405 may be arranged to determine the frequency distribution value for a class as the number of pixels in the subset that have a disparity value corresponding to the disparity level for the class.

Thus, the distribution evaluator 405 generates a frequency distribution which reflects how the pixels that have visual characteristics corresponding to those defined by the image property criterion are distributed in the depth/disparity dimension.

The distribution evaluator 405 is coupled to an analyzer 407 which is arranged to determine a shape property for the frequency distribution. The shape property reflects the shape of the distribution and specifically reflects how the magnitude of the classes/bins vary over the distribution.

The analyzer 407 may for example be implemented as independent hardware in the form of a processing platform with interface circuits for receiving data from the hardware implementing the distribution evaluator. For example, a micro-processor or dedicated hardware integrated circuit may be used to implement the analyzer 407.

The analyzer 407 may specifically generate a single value which is indicative of a shape property of the frequency distribution. The shape property may for example be a maximum magnitude of the distribution. The maximum value may be an indication of whether a large number of the detected pixels are located in a narrow depth range, i.e. whether the detected pixels are concentrated at a specific depth, or whether the detected pixels are more evenly spread across the depth range.

As an example, a shape property may be generated to reflect the likelihood of e.g. white overlay graphics being present in an image. For example, in some scenarios, images may be received which may or may not contain titles. These titles may specifically be assumed (or known) to be white and typically the titles will be graphics objects that are positioned at one specific depth in front of the screen level. Thus, in the example, the graphics (title) overlay is characterized by being formed by white pixels that are at one specific disparity level in front of the screen. The subset selector 403 first evaluates the color of all pixels in the image and generates a subset of pixels comprising all the pixels that are considered to be white in accordance with a suitable image property criterion (e.g. that the RGB values are all sufficiently high). A frequency distribution is then generated for these pixels with the classes/bins corresponding to different disparity levels. In this case, all white pixels that are part of overlay graphics (the titles) will fall in the same bin/class whereas other white pixels are likely to be more evenly distributed across the different classes/bins (i.e. they will tend to be distributed in depth).

The analyzer 407 may in this case determine a shape property which indicates whether the white pixels tend to be concentrated into a single bin/class (i.e. be at the same depth) or whether they tend to be distributed more evenly. In the example, the analyzer 407 may simply generate a shape property which indicates how many pixels are in the class/bin with the most pixels, i.e. it may generate the shape property as the maximum magnitude. When the image contains a title overlay, this is likely to be high, as all the white pixels of the title are at the same depth and thus fall in the same class. When the image does not contain a title overlay, it is likely to be lower as the white pixels are evenly spread. In some cases, the magnitude may be normalized to the total amount of pixels in the subset. Thus, a shape property in the form of the maximum number of pixels in one class may provide a good indication of whether the image contains a title overlay or not.

More generally, a shape property may be generated which reflects whether the current image comprises a large number of pixels that meet a specific visual criterion and which are also located in a narrow depth range (and specifically at the same depth/disparity level). Such a shape property may specifically reflect the probability that a flat image object with given visual characteristics are present in the image. This approach may in particular be suitable for detecting objects such as overlay graphics which may be characterized by often having homogenous and specific visual characteristics, and by being very flat (and typically to be limited to one disparity level).

Since graphics objects are often positioned in front of the screen (at negative disparities when the left-eye image is used as reference for the disparity vector), it may further be required that e.g. the disparity bin that contains the largest number of pixels must correspond to a position which is in front of the screen (i.e. a negative or zero disparity in the example). Bins corresponding to objects that lie behind the screen are thus ignored.

The analyzer 407 is coupled to an adaptor 409 which is arranged to determine a disparity remapping in response to the shape property.

The adaptor 409 is coupled to a remapper 411 which is also coupled to the receiver 401. The remapper 411 receives the 3D image from the receiver 401 and the disparity remapping from the adaptor 409.

The adaptor 409 and the remapper 411 may be implemented in separate hardware, and may specifically be implemented as separate processing platforms including a suitable micro-processor or micro-controller as well as associated interface circuitry capable of receiving and transmitting data from and to other hardware processing platforms implementing the other functional parts of the apparatus.

The remapper 411 is arranged to modify the disparity values of the received 3D image by applying the disparity remapping to the disparity values. The disparity remapping provides an output disparity value as a function of an input disparity value with the function/mapping being dependent on the shape property.

Specifically, the disparity remapping may include a disparity compression such that at least one disparity range is compressed into a smaller disparity range for at least some values of the shape property.

As a specific example, if the shape property indicates a relatively low maximum magnitude of the frequency distribution (and thus is indicative of a relatively low probability that the received image comprises any overlay graphics), the disparity remapping may be generated to not actually change any disparity values, i.e. the output value may be generated to be exactly the same as the input disparity value. In this example, the output/modified 3D image may be identical to the image that was received by the receiver.

However, if the shape property indicates a relatively high maximum magnitude of the frequency distribution (and thus is indicative of a relatively high probability that the received image comprises any graphics overlay), the disparity remapping may be generated to reduce the disparity range for objects in front of the screen level. For example, if disparity values from 128-255 are indicative of depth levels in front of the screen, the disparity remapping may be generated such that it compresses this range down to values from 128-160. Thus, the depth range in front of the screen of the 3D display device 413 is reduced substantially in the resulting output/modified 3D image.

As a consequence, the perceived impact of errors and inaccuracies in disparity values may be substantially reduced as the depth range is reduced. As such artefacts are often particularly prevalent and noticeable around overlay graphics, the apparatus allows for adaptation which is dependent on a specific analysis of the received 3D image to determine an indication of the probability that this comprises overlay graphic elements.

Indeed, the Inventors have realized that the disparity estimation errors when performing disparity estimation are particularly significant around overlay graphic objects. The Inventors have realized both that errors tend to be more perceptible around overlay graphic objects due to these typically standing out from the surrounding areas both in terms of the visual properties (color/brightness) and the depth differentials, and that the errors tend to be more prevalent around overlay graphics objects (because these typically contain thin objects (lines, text) that suffer from disparity filtering). Thus, the Inventors have realized that disparity errors tend to be more prevalent around e.g. overlay graphic objects and also tend to be more perceptible around such objects.

The inventors have furthermore realized that these effects may be mitigated by applying an adaptive remapping of the disparity values of the image and that the adaptive remapping may be dependent on an indication of a probability of the image comprising overlay graphics. The apparatus of FIG. 4 may provide a specific and advantageous approach for performing this function.

However, it will be appreciated that the apparatus of FIG. 4 is not limited to detection of the potential presence of overlay graphics but may be used for detection of many other possible image objects or characteristics. In particular, it is noted that the described approach provides an approach that allows depth remapping to be dependent on the presence of properties with specific visual and depth characteristics.

It will also be appreciated that the disparity remapping does not necessarily have to perform disparity compression but that in other embodiments, it may e.g. be desirable to expand the depth range in case of specific image properties or objects being detected by the described approach.

However, in the specific example described, the apparatus of FIG. 4 is arranged to increase a degree of disparity compression for at least a range of disparity levels in response to the shape property being indicative of an increased probability of the received 3D image comprising overlay graphic objects.

The approach reflects the Inventor's realization that most of the graphics objects have particular characteristics in terms of image properties as well as disparity. For example, very often, graphics objects lie on a plane with constant disparity (parallel to the virtual camera plane) which is most often not the case for other content/normal images of scenes because of arbitrary camera orientation. Often, graphic objects contain steeper edges than other content. Also, typical pictures of real life scenes suffer from the limited depth-of-field of the camera whereas graphics is inserted later and is typically sharp. The specific approach also reflects the Inventor's realization that graphics objects, such as opening credits, subtitles and logos, are often placed rather far out of the screen level but at a constant disparity. This also results in disparity artefacts being very noticeable around overlay graphics objects as a disparity value from the background mixing with the disparity value of the overlay graphics object will result in a large error due to the large disparity difference.

In the specific example, these considerations are reflected by the generation of a frequency distribution of the occurrence of specific image properties, such as sharp edges, as a function of disparity or depth. If at a certain out-of-screen disparity the frequency of sharp edges exceeds a threshold, then it is likely that an out-of-screen graphics object is present and therefore the disparity/depth map is modified (specifically by disparity compression) in order to mitigate the possible presence of disparity artefacts.

Practical evaluation has demonstrated that reducing all out-of-screen disparity depending on a shape property of a frequency distribution of e.g. the number of sharp edges found for a given disparity level provides very efficient mitigation. Effectively, the graphics object (and all other content with out-of-screen disparity) is compressed back towards the screen depth thereby making the errors less noticeable. As a specific example, the apparatus may be arranged to reduce the out-of-screen depth effect for scenes that include out-of-screen graphic objects while it is maintained unchanged for images that do not include out-of-screen graphic objects. This has been found to provide a substantially improved user experience.

The specific image property criterion used will depend on the specific preferences and requirements of the specific embodiment and application.

In many embodiments, particularly advantageous performance is achieved by the image property criterion being directed to selecting pixels that are likely to belong to an image object edge, and specifically to belong to a transitional area between different image objects.

In many embodiments, the image property criterion may comprise a requirement that the image property difference between the pixel and a neighboring pixel exceeds a threshold. The neighbor pixel may for example be required to be a pixel which is within a given distance of the current pixel, such as for example with a maximum distance to the current pixel of one, two, three, five or ten pixels. If the image property difference between the pixel and the neighboring pixel exceeds a threshold, it may be considered that the current pixel is part of an image object edge, and the pixel may be included in the subset. The threshold may for example be that a color difference (e.g. measured as the total accumulated difference between individual color channel (e.g. RGB) values) exceeds e.g. 100% of the total range for one color channel value (e.g. for 8 bit RGB values, it may be required that the sum difference between corresponding color channel values exceeds 256).

In many embodiments, the image property criterion may require that an image property difference (e.g. the intensity) between the current pixel and an adjacent pixel exceeds a given threshold (i.e. the image property difference between the current pixel and a neighbor pixel that is immediate adjacent/within a distance of one pixel from the current pixel). For example, it may be required that the difference in intensity exceeds, say, 30% of the maximum intensity. If this criterion is met, the pixel is considered to be an edge pixel. This criterion may in particular be very suitable for detecting and selecting pixels that are at the edge of an overlay graphics object as these tend to have very sharp edges (typically sharp transitions between adjacent pixels). For example, if a bright white graphics element is overlaid a relatively darker image, the white edge pixels of the graphics object will typically be adjacent a darker pixel corresponding to the underlying image. Such sharp transitions are unlikely to occur in images of natural scenes and thus provide a very accurate differentiation between normal image variations and transitions between graphic objects and image content.

Thus, in many embodiments, the subset selector 403 may be arranged to generate an edge detection indication for pixels where the edge detection indication is indicative of whether the pixel belongs to an image object edge or not. A suitable edge detection indication may for example be an image property difference between the pixel and one or more neighborhood or adjacent pixels. The neighborhood (or adjacent) pixel may for example be predefined or found within a given neighborhood, such as for example the pixel resulting in the largest difference and with a distance of no more than two pixels from the current pixel. In this way an edge detection indication is generated which is indicative of a probability that the pixel belongs to an image object edge.

The image property criterion may then require that this edge detection indication is above a given level. If so, it is considered that an edge between image objects, and probably between a graphics object and the underlying image, has been found. Thus, it is considered that the pixel is an edge pixel and it is accordingly included in the subset for generation of the frequency distribution.

In some embodiments, the subset selector 403 is arranged to generate an image property transition measure for each pixel. The described edge detection indication of a difference between the current pixel and one or more neighborhood pixels may also be a suitable image property transition measure. The image property transition measure may specifically be indicative of a gradient or change of the image property at the position of the pixel.

In other embodiments, the image property transition measure may not be specifically aimed at detecting edges but may instead be adapted to detect flat areas of image objects. For example, a variance of the image property in a neighborhood (of e.g. 10 pixels radius) may be determined. The variance may be used as an image property transition measure and the image property criterion may include a requirement that the pixel is only included in the subset if the variance is below a threshold. Accordingly, the pixel is only included if it belongs to a flat and homogenous image area.

Such an approach may for example be useful for detecting the presence of homogeneous graphics (e.g. a single color graphics) in an image that is not expected to include other large areas of homogeneous object (such as typically images generated by cameras capturing real life situations). If the resulting frequency distribution shows a large number of pixels at a specific depth, this indicates that the image comprises a large number of pixels being part of very homogeneous areas and at a specific depth level. This indicates the presence of overlay graphic objects in the received 3D image.

It will be appreciated that in many embodiments, the apparatus may consider a plurality of values, such as e.g. different color channel values. In such cases, the described approach may e.g. be applied individually to each color channel. The apparatus may e.g. generate an edge detection indication value or image property transition measure value for each color channel and then combine these into a single edge detection indication value or image property transition measure value which is used to evaluate the image property criterion. In some embodiments, the image property criterion may comprise a requirement for each of the color channels.

It will be appreciated that other parameters may alternatively or additionally be considered by the image property criterion in other embodiments.

In many embodiments, the image property criterion may comprise a requirement for the luminance and/or chroma of the pixel. For example, it may be required that the brightness of the pixel is above a given level and/or that the chroma/color falls within a specific area.

For example, it may be required that the luminance is above a given level and that the maximum difference between color channel values (of e.g. an RGB representation) is below a threshold (say of 20% of the total range). This may reflect a consideration that overlay graphics is bright and substantially white (which may be known to be the case in some embodiments). Thus, in such an example, the apparatus may be adapted to adjust the depth range of the modified image based on a consideration of whether the image comprises a sufficiently large number of substantially white and sufficiently bright pixels located at substantially the same depth.

In some embodiments, the subset selector 403 may generate a pixel color property measure for each pixel and the image property criterion may comprise a requirement for the color property measure.

The color property measure may specifically be a color saturation measure. In some embodiments, overlay graphics may be characterized by using very saturated colors. In such embodiments, the subset selector 403 may generate an indication of the saturation of the color. For example, the difference between the largest color channel value and the next largest color channel value may be determined as a color saturation measure. The image property criterion may then require that this color saturation measure exceeds a threshold (such as e.g. 50% of the maximum value).

The shape property determined by the analyzer 407 and considered by the adaptor 409 may depend on the preferences and requirements of the invention.

In many embodiments, the shape property may be indicative of a property of at least one peak of the frequency distribution, such as the magnitude. The shape property may be a property which indicates the peakedness of the frequency distribution.

In situations where the evaluated image comprises overlay graphics, the subset of pixels is likely to comprise a large number of pixels that are all at the same depth layer. Accordingly, many of the pixels will fall into the same disparity level class or bin. As a consequence, the frequency distribution will tend to have a high concentration of pixels at very specific disparity levels (i.e. very specific bins). Indeed, typically all overlay graphic objects will tend to be positioned at the same depth level, and accordingly there will be a very high concentration of pixels of the subset in one bin/class of the frequency distribution.

The system may accordingly in many embodiments generate a shape property which reflects how much the frequency distribution is concentrated into individual peaks. A frequency distribution which has one large and narrow peak is likely to indicate the presence of overlay graphics. A frequency distribution which is relatively flat and does not comprise any peaks is likely to indicate that the image does not contain any overlay graphics.

In some scenarios, an image may include overlay graphics at different depth levels and accordingly this may result in more than one peak in the frequency distribution. Therefore, in some embodiments, the system may include a consideration of more than one peak.

It will be appreciated that different shape properties reflecting the degree of peakedness of the frequency distribution may be used. The peakedness may be considered to be a measure of the concentration of the pixels into classes/bins/disparity levels.

The peakedness of a frequency distribution may be indicative of whether the pixels are broadly distributed over the classes or whether they tend to be concentrated into one or a few bins (or possibly groups of adjacent bins). A peak may typically be indicated by having a significantly higher magnitude than classes in the neighborhood of the peak. The peak may thus typically be a local or global maximum. The peak may be characterized by the maximum magnitude as well as how fast it falls off. Thus, e.g. a peak may be characterized by a magnitude and width (e.g. at 50% of the maximum magnitude). The peakedness may thus for example be indicated by the maximum magnitude and/or width. Alternatively or additionally, the peakedness may be indicated by the number of peaks present for the frequency distribution (where a suitable peak detection criterion is used). For example, if the frequency distribution comprises one or more peaks, it may be considered that the image includes overlay graphics and if it does not contain any peaks, it may be considered that it does not contain any overlay graphics.

For example, in some embodiments, the analyzer 407 may include a peak detector which is arranged to detect the presence of peaks in the frequency distribution. Any suitable peak criterion may be used to detect a peak, such as e.g. that the magnitude of the peak must exceed an average magnitude, or e.g. the magnitudes of the two adjacent bins, by a given threshold. For example, a peak may be considered to be present if the magnitude of a bin is three times higher than the magnitudes of both the adjacent bins. The analyzer 407 may then proceed to determine the shape property as the height of e.g. the maximum peak, or e.g. as the combined height of the detected peaks.

It will be appreciated that different shape properties may be used in different embodiments.

A particularly advantageous approach has been found to be to base the shape property on a magnitude of a mode of the frequency distribution. Specifically, the shape property may in some embodiments be generated in response to the magnitude of the mode having the largest magnitude, i.e. the main mode.

Thus, in some embodiments, the mode may be the global maximum and thus reflect the most often occurring class, i.e. the disparity level (or disparity level range) for which the frequency distribution has a global maximum. However, in some embodiments, the approach may consider one or more local maxima (e.g. requiring them to meet certain characteristics such as having a value of at least, say, 50% of the global maximum).

In some embodiments, a relatively low complexity approach for determining the shape property may be used.

For example, in some embodiments, the analyzer 407 may be arranged to determine the shape property based on the maximum frequency of the frequency distribution, and specifically the shape property may in some embodiments be determined directly as the maximum frequency of the frequency distribution. Thus, in some embodiments, the analyzer 407 may simply proceed to search through the classes of the frequency distribution to find the one with the highest magnitude. The shape property may then be set equal to this value, or may e.g. be normalized with respect to the total number of pixels in the subset. Such an approach may be considered to correspond to setting the shape property to the magnitude of the (main) mode of the frequency distribution.

Such an approach may allow a low complexity approach, yet has been found to provide very advantageous results in practice.

In some embodiments, the analyzer 407 may be arranged to determine the shape property based on a maximum frequency of the frequency distribution relative to an averaged frequency for the frequency distribution.

In some embodiments, the analyzer 407 may be arranged to determine the shape property based on a peak frequency of the frequency distribution relative to frequencies in a disparity level neighborhood of the peak frequency. The maximum magnitude may specifically be compared to the magnitudes of other bins in the neighborhood of the maximum magnitude bin. For example, it may be compared to the average magnitudes of, say, the four surrounding bins. Such an approach may provide a stronger indication of whether the pixels correspond to overlay graphics or not in many embodiments.

In some embodiments, the shape property may for example be determined by identifying the maximum frequency, i.e. the maximum magnitude in the frequency distribution. The analyzer 407 may then retrieve the maximum of, say, the two bins to either side of the current bin. It may then proceed to determine the average of these four bins. Finally, the shape property may be given as the maximum magnitude of the frequency distribution divided by the determined average value. Thus, the shape property indicates how large the main peak of the frequency distribution is relative to the surrounding values. Accordingly, a shape property is generated which reflects both the magnitude and the width of the peak.

In some embodiments, the shape property may not only compare to a neighborhood but may be a comparison to the entire frequency distribution. For example, rather than just generating the average frequency from bins in a neighborhood of the maximum frequency, the analyzer 407 may determine the average frequency for the entire frequency distribution (e.g. excluding the mode bin). In this case, the shape property may e.g. be generated as the maximum magnitude divided by the average frequency for the frequency distribution. This parameter may provide a good indication of a normalized maximum magnitude but may not as accurately reflect the width of a main peak.

In some embodiments, the analyzer 407 may be arranged to determine the shape property based on a width measure for a peak of the frequency distribution. For example, the analyzer 407 may detect the maximum magnitude of the frequency distribution. It may then proceed to determine the distance (in terms of the number of bins (or e.g. disparity levels if each bin comprises more than one disparity) before the magnitude is less than, say, 50% of the detected magnitude. As overlay graphics is typically restricted to a single disparity level (i.e. all the pixels belonging to a the overlay graphics are at the exact same depth level and thus have the same disparity value), the presence of overlay graphics will tend to result in a peak which has a width of a single bin, i.e. the adjacent bins are likely to have a magnitude less than 50% of the magnitude. However, image objects of typical images or real scenes tend to have a much more gradual transition. For example, if the image contains a large white ball, the pixels corresponding to this ball may be included in the subset. However, as these pixels may be concentrated at the depth of the ball which is in a small range but varies from the center to the edge of the ball, the transition tends to be much more gradual and the peak in the frequency distribution is likely to spread over a plurality of disparity levels. Accordingly, the width will be larger than for overlay graphics and this may be reflected in a shape property reflecting the width of a detected peak in the frequency distribution. Thus, in many scenarios the approach could differentiate between overlay graphics and other image objects with the same image properties.

In many embodiments, the remapper 411 may be arranged to perform a disparity compression of the disparity values. Thus, the disparity remapping may include a mapping of a first range of disparity levels into a second range of disparity levels where the second range is smaller than the first range. In some embodiments, the first range may correspond to the entire range of disparity levels, i.e. to all possible values of the disparity values. However, in other embodiments, the disparity compression may only be applied in a subrange of the entire disparity level range.

Indeed, in many embodiments, the disparity compression may be limited to the range in front of the display/screen level, i.e. the compression is performed only for pixels for which the disparity values indicate that it is in front of the screen. This may reflect that the overlay graphics are typically positioned in front of the screen level.

The disparity compression is typically a disparity reduction. Thus, the remapper 411 may typically provide a disparity remapping which reduces the disparity in the image (at least for a range of disparities).

The remapper 411 may in many embodiments be arranged to increase the degree of disparity compression provided by the disparity remapping in response to the shape property indicating a higher degree of peakedness. Specifically, the higher the magnitude of the (main) mode, the narrower the width of the main peak etc., the higher is the compression resulting from applying the disparity remapping.

In some embodiments, the disparity remapping may simply be adapted by switching between introducing a disparity compression or not dependent on the shape property. Specifically, if the shape property indicates that the image does not include significant overlay graphics (e.g. if the magnitude of the (main) mode is below a threshold, e.g. of 20% of the total number of pixels in the image or 50% of the number of pixels in the subset), the disparity remapping may simply be a unity function where the output value is equal to the input value (equivalent to the disparity remapping not being applied to the disparity values). However, if the shape property indicates that the image does include significant overlay graphics (e.g. if the magnitude of the (main) mode exceeds the threshold), the disparity remapping may compress all out-of-screen disparity values to zero.

Accordingly, in such an embodiment, the system may automatically adapt the operation such that when an input image is received that is detected to comprise overlay graphics, any objects in front of the screen level are pushed back into the screen level. Accordingly, errors and inaccuracies in the disparity values surrounding the overlay graphics will be less significant as the disparity difference of the graphics with surrounding regions will typically reduce. Thus, the disparity estimation errors are mitigated (at the expense of the 3D effect). However, if an input image is received which is detected not to comprise overlay graphics, no changes are introduced and the original image may be rendered including the depth characteristics in front of the screen.

In many embodiments, the disparity compression will be less drastic and the dependency on the shape property will also be less extreme. For example, in many embodiments the disparity remapping may be a linear remapping in at least a disparity level subrange, such as for example for disparity levels in front of the screen level.

For example, disparity values in front of the screen may be multiplied by a remapping coefficient or gain which specifically may be in the interval from 0 to 1. The actual gain is determined in response to the shape property. For example, the gain may be determined as a function of the magnitude of the (main) mode. As a specific example, the gain may be set as the total number of pixels in the subset minus the number of pixels with the disparity value of the (main) mode disparity level divided by the total number of pixels in the subset. This may result in a disparity compression which is gradually increased for an increased peakedness of the frequency distribution.

As described, in some embodiments the remapper may be arranged to modify disparity values in only a subrange of a disparity range for the disparity values. The subrange may for example be the range of disparity values in front of the screen. In other embodiments, the subrange may for example be a more limited or specific range.

Also, in some embodiments the analyzer 407 may be arranged to determine the shape property in response to only a disparity value subrange for the frequency distribution. For example, when determining the (main) mode, only the disparity levels in a given range may be considered. For example, as overlay graphics are typically in front of the screen, the analyzer 407 may consider only disparity values corresponding to depths in front of the screen level.

In some embodiments, information may be available or may be assumed about the range in which overlay graphics are likely to occur and the analyzer 407 may consider only that range when determining the shape property. For example, it may be assumed that overlay graphics will only be present at disparity levels from e.g. 230 to 255 (for an eight bit disparity value). In this case, the analyzer 407 may only evaluate (or indeed generate) the frequency distribution for this specific range. For example, the shape property may be generated as the maximum magnitude in the interval from 230 to 255.

In the following, a specific example of a detailed implementation will be described. The example is based on detecting a subset of pixels which are step edge pixels. Specifically, a subset is generated comprising pixels for which an image value difference to adjacent pixels exceed a threshold. A frequency distribution is then generated for this subset and a remapping is adapted based on a characteristics of the frequency distribution.

The example will utilize the following main parameters and variables.

Parameters

| | |
|---|---|
| $E_{min}$ | Threshold used to determine whether a pixel is a step edge, i.e. whether it belongs to the subset of pixels or not. $E_{min} = 30$. |
| $D_{low}$ | Depth/disparity value above which remapping is applied. $D_{low} = 128$ (eight bit disparity values from 0 to 255 are used). |
| $N_{low}$ | Edge frequency above which a remapping is applied (Gain $g > 0$). $N_{low} = 10000$. |

Variables

| | |
|---|---|
| $N_{edge}[k]$ | Number of step edge pixels as a function of disparity level $k \in \{0, \ldots, 255\}$. |
| $I_{i,j}^{(c)}$ | Color channel c of image at pixel i, j (RGB values are considered). |
| $D_{i,j}$ | Input disparity map value at pixel (position) i, j. |
| $D_{i,j}^{out}$ | Output (re-mapped) disparity map at pixel (position) i, j. |
| $g$ | Gain [0, 1] used in the remapping of disparity values $\{D_{low}, \ldots, 255\}$. |

First the frequency of edge pixels is determined as a function of the disparity levels.

The number of step edge pixels is a particularly useful measure since a high number of step edge pixels often coincides with the occurrence of graphics objects. This is even more so if these edges occur for 'out-of-screen' disparity values since graphics objects (such as opening credits) are often rendered in the foreground.

In the example, the number of edge pixels as a function of disparity level is determined as:

$$N_{edge}[k] = \sum_{i,j} \begin{cases} 1 & \text{if } \sum_{c \in \{r,g,b\}} \frac{|I_{i,j}^{(c)} - I_{i-1,j}^{(c)}| + |I_{i,j}^{(c)} - I_{i,j-1}^{(c)}|}{2} > E_{min} \wedge D_{i,j} \equiv k \\ 0 & \text{otherwise} \end{cases}$$

Thus, the equation illustrates the exemplary generation of a frequency distribution based on the image property criterion of:

$$\sum_{c \in \{r,g,b\}} \frac{|I_{i,j}^{(c)} - I_{i-1,j}^{(c)}| + |I_{i,j}^{(c)} - I_{i,j-1}^{(c)}|}{2} > E_{min}$$

The following code fragment illustrates how this equation may be implemented in C++ using OpenCV types. The code fragment stores the edge information but from the above equation it is clear that this is not necessary. Only $N_{edge}$ needs to be stored for each depth level $k \in \{0, \ldots, 255\}$.

```
void DetectEdges(  const Mat_<Vec3b>& I,
    Mat_<int>& E)
{
// Parameters
  const int Emin = 30;
// Variables
  int i,ii,j,jj,k;
// Initialize
  E.setTo(0);
// Detect edges
  for (i=1; i<I.rows; i++) {
    for (j=1; j<I.cols; j++) {
      int r1 = (int) I(i−1,j)[0];
      int g1 = (int) I(i−1,j)[1];
      int b1 = (int) I(i−1,j)[2];
      int r2 = (int) I(i,j−1)[0];
      int g2 = (int) I(i,j−1)[1];
      int b2 = (int) I(i,j−1)[2];
      int r = (int) I(i,j)[0];
      int g = (int) I(i,j)[1];
      int b = (int) I(i,j)[2];
      int dr1 = abs(r−r1);
      int dg1 = abs(g−g1);
      int db1 = abs(b−b1);
      int dr2 = abs(r−r2);
      int dg2 = abs(g−g2);
      int db2 = abs(b−b2);
      int dr = (dr1+dr2)/2;
      int dg = (dg1+dg2)/2;
      int db = (db1+db2)/2;
      if (dr+dg+db > Emin) {
        E(i,j) = 1;
      }
    }
  }
}
```

The input disparity map in range $\{0, \ldots, 255\}$ is now remapped to an output depth map in range $\{0, \ldots, 255\}$ using the following formula:

$$D_{i,j}^{out} = D_{low} + \left\lfloor \max(g(D_{i,j} - D_{low}), 0) + \frac{1}{2} \right\rfloor,$$

where the gain is calculated as:

$$g = \frac{\max\left(N_{low} - \max_{k \in \{128, \ldots, 255\}}(N_{edge}[k]), 0\right)}{N_{low}}.$$

Thus, the disparity remapping indicated above is adapted based on a shape property given by:

$$\max_{k \in \{128, \ldots, 255\}}(N_{edge}[k])$$

i.e. the shape property is given as the (main) mode of the frequency distribution (in the subrange in front of the screen.

In the example, maximum frequency is determined for the subrange of $\{128, \ldots, 255\}$ where a value of 128 corresponds to a zero disparity. Excluding values smaller than 128 means that the gain is only set to a value smaller than 1 in case sharp edges are present in-front-of screen.

The following code fragment illustrates how remapping may be implemented in C++.

```
void RemapDepth( const vector<int>& Nedge,
    Mat_<Vec3b>& D)
{
  // Parameters
  const int Dlow = 128;
  const double Nlow = 10000.0;
  // Variables
  int i,ii,j,jj,k;
  int Nmax = 0;
  double gain = 0.0;
  // Search maximum in histogram
  for (k=128; k<(int) H.size( ); k++) {
    if (Nedge [k] > Nmax) Nmax = Nedge[k];
  }
  // Calculate gain {0,1}
  gain = max(0.0,(double) Nlow - Nmax)/ Nlow;
  // Remap
  for (i=0; i<D.rows; i++) {
    for (j=0; j<D.cols; j++) {
      int value = D(i,j)[0];
      if (value > Dlow) {
        int remapvalue = Dlow + floor(gain*(value-128) + 0.5);
        D(i,j)[0] = remapvalue;
        D(i,j)[1] = remapvalue;
        D(i,j)[2] = remapvalue;
      }
    }
  }
}
```

Figure 1:
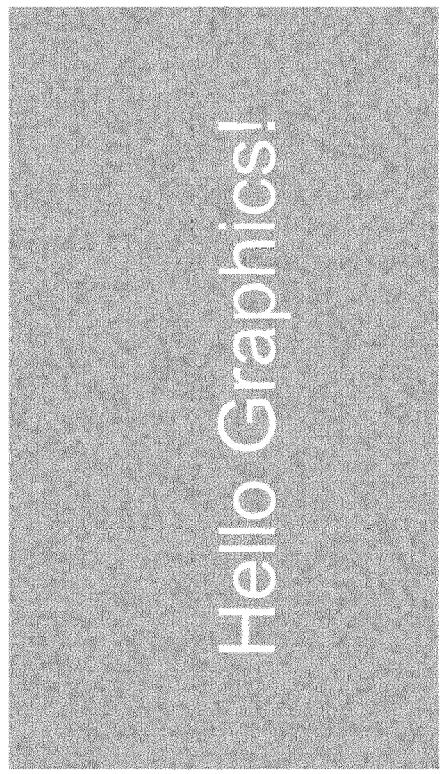
FIG. 1 illustrates an example of a stereo 3D image comprising a left and right eye picture with overlay graphics.
Figure 1:
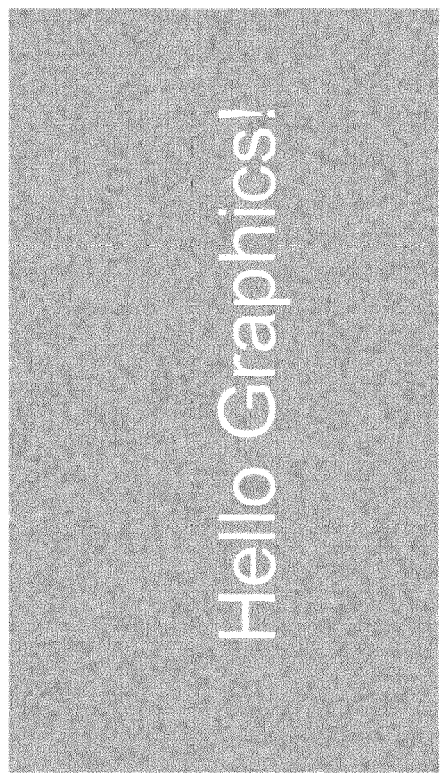
Figure 2:
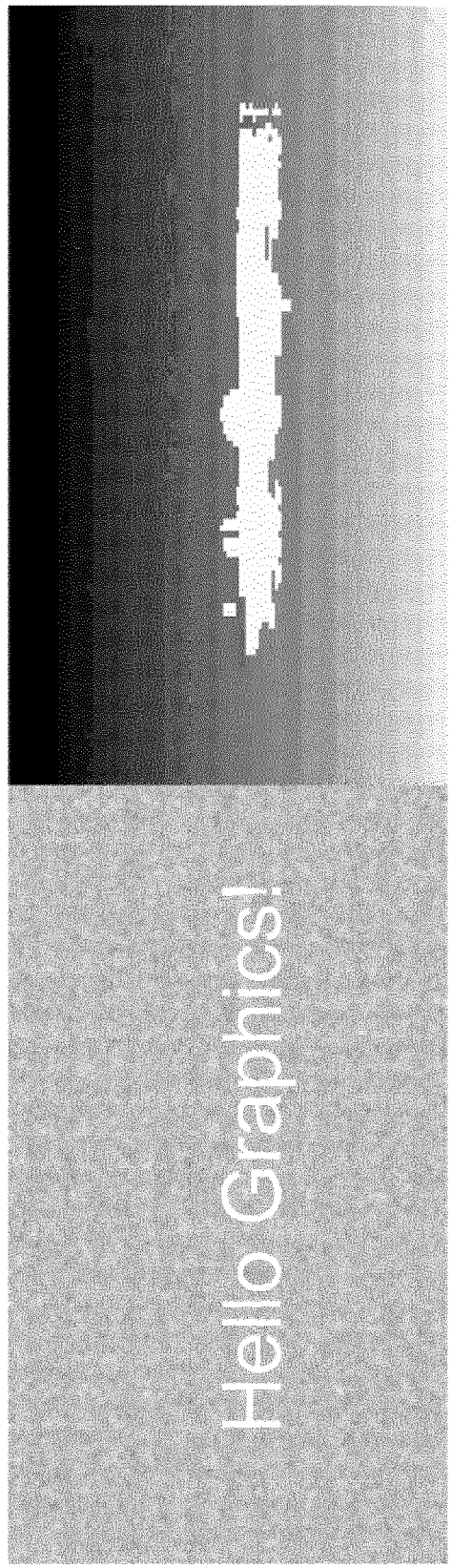
FIG. 2 illustrates an example of the 3D image of FIG. 1 represented by a left eye picture and a disparity map generated by disparity estimation from the stereo image of FIG. 1.
Figure 3:
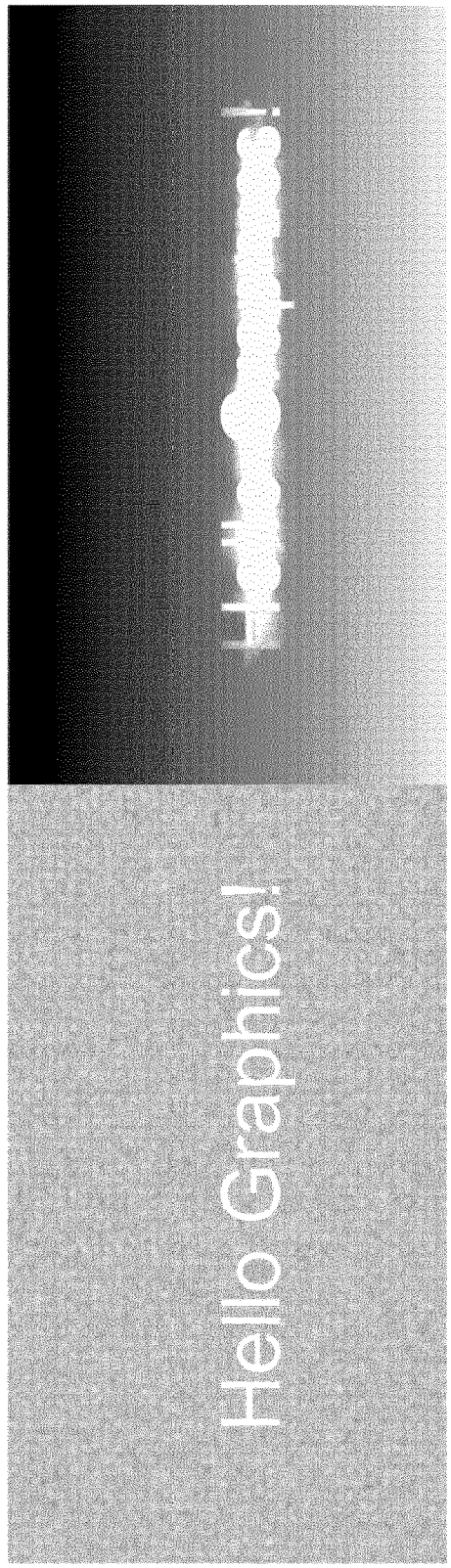
FIG. 3 illustrates an example of the 3D image of FIG. 2 after filtering of the disparity map.
Figure 5:
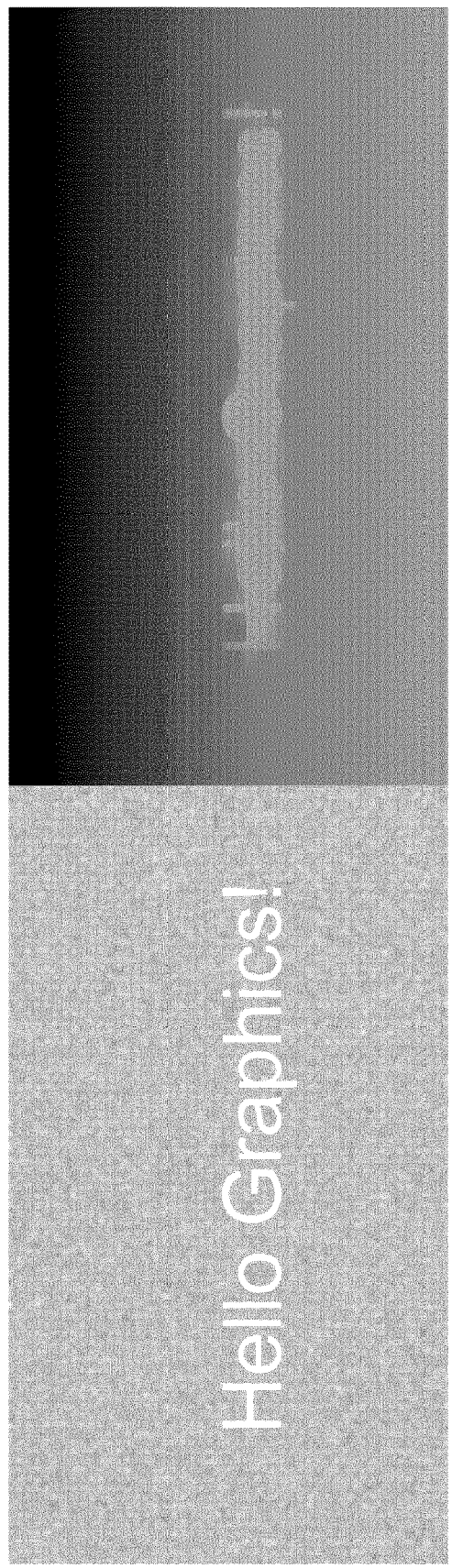
FIG. 5 illustrates an example of the 3D image of FIG. 3 after processing by an exemplary embodiment of the apparatus of FIG. 4.

FIG. 5 illustrates the result of applying this approach to the examples of FIG. 1-3. As can be seen, the resulting disparity values of the text are much closer to the disparity values of the surrounding background thereby avoiding large rendering errors due to disparity errors. Thus, a substantially improved 3D image rendering can be achieved.

The previous description has focused on examples wherein the selection and analysis of the subset of pixels is generated on the basis of one parameter. For example, a subset may be generated based on edge detection or color saturation, and the frequency distribution of this may accordingly be determined. However, in other embodiments, the approach may consider a plurality of parameters and characteristics. Specifically, the image property criterion may include a consideration of a plurality of parameters. For example, in order for a pixel to be included in the subset, the image property criterion may require both that it meets the requirement for being considered an edge pixel and that it has a saturation level above a given threshold (e.g. the difference between the maximum and minimum color channel values must be at least 50% of the maximum range).

In some embodiments, the subset selector 403 may be arranged to generate a plurality of subsets and to adapt the mapping based on the plurality of subsets. For example, one subset of pixels may be generated that meet a first image property criterion, say the requirement for the pixel to be an edge pixel. A second subset of pixels may be generated to comprise pixels that meet a second image property criterion, such as that the pixels must have a saturation level above a given threshold (e.g. the difference between the maximum and minimum color channel values must be at least 50% of the maximum range).

The disparity remapping may then be adapted based on both subsets.

This may for example be done by generating a frequency distribution for each subset. A shape property may then be generated for each frequency distribution separately. For example, the magnitude of the mode may be determined for both the first frequency distribution for the first subset of pixels and for the second frequency distribution for the second subset of pixels. The disparity remapping is then determined on the basis of both modes. Specifically, the first shape property and the second shape property may be combined into a common shape property, and the disparity remapping may be determined based on this. E.g. the magnitude of the (main) modes may simply be added together and the gain for a disparity compression may be calculated as a function of the total combined magnitude.

In other embodiments, the first and second subset of pixels may be combined into a combined subset of pixels and a frequency distribution for the combined subset may be calculated (corresponding to a single subset of pixels being determined from an image property criterion having alternative requirements that can be met for the pixel to be included in the subset). Equivalently, a first and second frequency distribution can be calculated for the first and second subset respectively and the two frequency distributions can then be combined into a single frequency distribution.

In the previous description, the frequency distribution was calculated by the occurrence of each pixel being weighted equally, i.e. the magnitude/frequency for a given class or depth layer (or range of depth layers in case each class comprises more than one depth layer) is given as the number of pixels in the subset for that class.

However, in some embodiments, the distribution evaluator 405 may be arranged to weight the pixel when generating the frequency distribution. Specifically, the contribution of each pixel to the class may be given as a value that may vary between different pixels.

The weight may specifically depend on the image position of the pixel. For example, the weight may decrease with an increasing distance from the pixel to a center position of the image. Thus, in such embodiments, the central pixels will weigh heavier than the image border pixels in the frequency distribution, and the remapping will be more heavily dependent on the central pixels than the border pixels.

In some embodiments, a weight between e.g. 0 and 1 may be calculated for each pixel based on the distance of the pixel to the center position of the image/screen. When generating the frequency distribution, the magnitude for a given class/disparity level can then be determined as the sum of the weights of each pixel in the subset having a disparity value corresponding to that class/disparity level. Thus, the approach can be considered to correspond to the generation of a frequency distribution where fractional occurrences (rather than a simple binary occurrence or not) is considered.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way.

The invention claimed is:

1. An apparatus for processing a three dimensional image, the apparatus comprising:
   a receiver circuit arranged to receive a three dimensional image comprising image data and disparity data, wherein each pixel of at least a group of pixels of the three dimensional image has an associated image value and an associated disparity value;
   a subset selector circuit arranged to evaluate an image property criterion for the associated image value of each pixel of the group of pixels and determining a subset of pixels of the group of pixels for which the image property criterion is met;
   a distribution evaluator circuit for generating a frequency distribution of the associated disparity values of the subset of pixels;
   an analyzer arranged to determine a shape property for the frequency distribution, wherein the shape property is indicative of a property of at least one peak of the frequency distribution;
   an adaptor circuit for determining a disparity remapping in response to the shape property, wherein the adaptor is arranged to increase a disparity compression provided by the disparity remapping in response to an increasing peakedness of the frequency distribution;
   a remapper circuit arranged to modify the associated disparity values of at least a portion of the pixels of the three dimensional image by applying the disparity remapping to the associated disparity values the portion of the pixels to produce modified disparity data; and
   an output circuit arranged to provide a modified three dimensional image comprising the image data and the modified disparity data to a three dimensional display device that renders the modified three dimensional image.

2. The apparatus of claim 1 wherein the analyzer circuit is arranged to determine the shape property in response to at least one parameter selected from the group consisting of,
   a maximum frequency of the frequency distribution,
   a maximum frequency of the frequency distribution relative to an averaged frequency for the frequency distribution,
   a width measure for a peak of the frequency distribution,
   a peak frequency of the frequency distribution relative to frequencies in a disparity level neighborhood of the peak frequency.

3. The apparatus of claim 1,
   wherein the subset selector is arranged to generate an edge detection indication for pixels of the group of pixels,
   wherein the edge detection indication is indicative of whether the pixel belongs to an image object edge or not,
   wherein the image property criterion comprises a requirement for the edge detection indication.

4. The apparatus of claim 1 wherein the subset selector is arranged to generate an image property transition measure for each pixel of the group of pixels, and the image property criterion comprises a requirement for the image property transition measure.

5. The apparatus of claim 1 wherein the image property criterion comprises a requirement for at least one of a luminance and a chroma for the pixel.

6. The apparatus of claim 1,
   wherein the disparity values have a disparity range,
   wherein the remapper circuit is arranged to modify disparity values in only a subrange of the disparity range.

7. The apparatus of claim 1 wherein the analyzer is arranged to determine the shape property in response to a disparity value subrange of the frequency distribution.

8. The apparatus of claim 1 wherein the disparity remapping is a linear remapping in at least a disparity level subrange, and the adaptor is arranged to determine a remapping coefficient for the linear remapping in response to the shape property.

9. The apparatus of claim 1,
   wherein the distribution evaluator is arranged to weight pixels of the subset of pixels when generating the frequency distribution,
   wherein the weight for a pixel is dependent on an image position of the pixel.

10. The apparatus of claim 1,
    wherein the subset selector is arranged to evaluate a second image property criterion for each pixel of the group of pixels and to determine a second subset of pixels of the group of pixels for which the second image property criterion is met,
    wherein the apparatus is arranged to determine the disparity remapping in response to a frequency distribution for the disparity values for the second subset of pixels.

11. A method of processing a three dimensional image on an image processing apparatus, the method comprising:
    receiving a three dimensional image comprising image data and disparity data, wherein each pixel of at least a group of pixels of the three dimensional image has an associated image value and an associated disparity value;

evaluating an image property criterion for the associated image value of each pixel of the group of pixels;

determining a subset of pixels of the group of pixels for which the image property criterion is met;

generating a frequency distribution for associated disparity values of the subset of pixels;

determining a shape property for the frequency distribution, wherein the shape property is indicative of a property of at least one peak of the frequency distribution;

determining a disparity remapping in response to the shape property, wherein a disparity compression provided by the disparity remapping increases in response to an increasing peakedness of the frequency distribution; and modifying the disparity values for at least a portion of the pixels of the three dimensional image by applying the disparity remapping to the disparity values for the portion of the pixels to produce modified disparity data; and providing a modified three dimensional image comprising the image data and the modified disparity data to a three dimensional display device that renders the modified three dimensional image.

12. The method of claim 11 wherein the determining of the shape property is in response to at least one parameter selected from the group consisting of, a maximum frequency of the frequency distribution, a maximum frequency of the frequency distribution relative to an averaged frequency for the frequency distribution, a width measure for a peak of the frequency distribution, a peak frequency of the frequency distribution relative to frequencies in a disparity level neighborhood of the peak frequency.

13. The method of claim 11,
wherein the subset selection is arranged to generate an edge detection indication for pixels of the group of pixels,
wherein the edge detection indication is indicative of whether the pixel belongs to an image object edge or not,
wherein the image property criterion comprises a requirement for the edge detection indication.

14. The method of claim 11 wherein the subset selection is arranged to generate an image property transition measure for each pixel of the group of pixels, and the image property criterion comprises a requirement for the image property transition measure.

15. The method of claim 11 wherein the image property criterion comprises a requirement for at least one of a luminance and a chroma for the pixel.

16. The method of claim 11,
wherein the disparity values have a disparity range,
wherein the remapping is arranged to modify disparity values in only a subrange of the disparity range.

17. The method of claim 11 wherein the analyzing is arranged to determine the shape property in response to a disparity value subrange of the frequency distribution.

18. The method of claim 11,
wherein the distribution evaluating is arranged to weight pixels of the subset of pixels when generating the frequency distribution,
wherein the weight for a pixel is dependent on an image position of the pixel.

19. The method of claim 11,
wherein the subset selecting is arranged to evaluate a second image property criterion for each pixel of the group of pixels and to determine a second subset of pixels of the group of pixels for which the second image property criterion is met,
wherein the method is arranged to determine the disparity remapping in response to a frequency distribution for the disparity values for the second subset of pixels.

20. The apparatus of claim 1, further comprising the 3D display device.

21. A non-transitory computer-readable medium comprising a program that, when executed by a processing system, causes the processing system to:

receive a three dimensional image comprising image data and disparity data, wherein each pixel of at least a group of pixels of the three dimensional image has an associated image value and an associated disparity value;

evaluate an image property criterion for the associated image value of each pixel of the group of pixels;

determine a subset of pixels of the group of pixels for which the image property criterion is met;

generate a frequency distribution for associated disparity values of the subset of pixels;

determine a shape property for the frequency distribution, wherein the shape property is indicative of a property of at least one peak of the frequency distribution;

determine a disparity remapping in response to the shape property, wherein a disparity compression provided by the disparity remapping increases in response to an increasing peakedness of the frequency distribution;

modify the disparity values for at least a portion of the pixels of the three dimensional image by applying the disparity remapping to the disparity values for the portion of the pixels to provide modified disparity data; and communicate a modified three dimensional image comprising the image data and the modified disparity data to a display device that renders the modified three dimensional image.

* * * * *